3,195,635
SPACERS FOR FRACTURE PROPS
Clarence R. Fast, Tulsa, Okla., assignor to Pan American Petroleum Corporation, Tulsa, Okla., a corporation of Delaware
No Drawing. Filed May 23, 1963, Ser. No. 282,582
8 Claims. (Cl. 166—42)

This invention relates to fracturing earth formations penetrated by wells. More particularly, it relates to depositing in the fractures props which are spaced apart by soluble spacing particles so that, when the soluble props are dissolved, large flow channels remain between the props.

The broad concept of using spaced props in fractures is disclosed and claimed in U.S. patent application Ser. No. 100,404, filed by myself and George C. Howard on April 3, 1961. Ser. No. 100,404 is a continuation-in-part of U.S. patent application Ser. No. 686,882, filed on September 30, 1957, now abandoned.

In using spacers with props it has been found that some of the spacer particles tend to break up when they pass through the pumps and flow down the well. The result is that the small particles bridge the openings between the larger particles in the fracture so the permeability of the fracture is not as high as might be desired. Flow through the fracture is slow, so a long period of time may be required to remove the soluble spacer particles from the fracture. In some extreme cases so many small particles may be produced that a bridge and seal is even formed over the face of the fracture before the fracture is extended as far as desired.

An object of this invention is to provide spacer particles for fracture props. A more specific object is to provide spacer particles which will not break up to form small particles which can bridge between the larger ones to form seals and decrease flow of fluids.

I have found that prilled urea is in a form which does not break readily and, when it does break, tends to form large partially rounded particles with less tendency to bridge the holes between unbroken prills and fracture props.

In the prilling process molten urea is dispersed into droplets in the top of a tall prilling tower. The droplets cool and solidify while falling to the bottom of the tower. There are many ways of dispersing the molten liquid into droplets, of treating the molten liquid before dispersion, and handling the solid prills after they are formed. These methods form no part of this invention. The various techniques of forming and handling urea prills do, however, affect the properties of the resulting prills. For example, unless water and free carbon dioxide and ammonia are thoroughly removed from the molten liquid urea, these gases expand when the liquid is sprayed into the prilling tower forming popcorn-like particles of urea which are very weak. If the molten liquid is sprayed violently into the prilling tower, the particles may not have an opportunity to assume a spherical shape before reaching the bottom of the column. In general, the less spherical the particles, the weaker they are. If the finished prills are handled in a liquid carrying agent, their original shape and strength are preserved. If handled in pneumatic conveyors, however, the prills may become broken and weakened.

Rather than attempting to specify the prills to be used by the methods of manufacture and handling, a simple test was devised. In this test a bar is balanced across a fulcrum. On the lower side of one end of the bar a small flat piece of tungsten carbide is attached. Below this tungsten carbide is another block of tungsten carbide. A urea prill is placed between the blocks, and weights are added to the bar until the prill crushes. This provides a direct measure of the crushing strength of the prills.

The strengths of the prills vary with diameter. Within the range of sizes, which will pass about a Number 4 U.S. Standard Sieve Series screen and be retained on about a Number 40 screen, the strength varies roughly linearly with diameter. Even prills of uniform diameter vary considerably in strength, so in determining how good a particular batch of prills might be, at least about ten prills should be broken individually to permit calculation of an average crushing strength.

Almost all prilled urea is superior to crystalline urea. This seems to be principally because of the almost spherical shape of the prills. The spherical prills offer no sharp corners or points which can be broken off to form fine particles. The small interlocked crystals in the prills also provide a rather surprising strength. It is best, however, to limit the use of prilled urea to particles having a crushing strength of at least 0.5 pound per particle in the $-14 +16$ mesh range; that is, in the range passing a Number 14 and being retained on a Number 16 screen of the U.S. Standard Sieve Series. Preferably, the strength should be as high as possible. Prills having average strengths above one pound per particle in the $-14 +16$ mesh range are available.

Considering again the effects of size of particles, it is fortunate that larger particles are stronger. For some reason that is not entirely understood, the larger particles seem to break slightly more easily than the smaller ones when liquid suspensions of the particles are passed through pumps, couplings, and tubing. This is in spite of the higher individual crushing strengths of the larger spheres. In order to overcome this effect, the minimum average strength of particles should be directly proportional to their diameters. Thus, while $-14 +16$ mesh spheres should have an average crushing strength of at least about 0.5 pound, prills twice as large in diameter should have an average crushing strength of at least about 1.0 pound. In general, the minimum crushing strength in pounds should be at least about ten times the diameter in inches. This is because the average diameter of $-14 +16$ mesh particles is about 0.05 inch. These should have an average crushing strength of at least about 0.5 pound, or ten times the diameter in inches.

To be sure the crushing strength is closely related to breakage during handling, a piston-type pump was used to circulate an oil slurry of urea prills through 15 feet of 2-inch tubing, including five swivel couplings, and into a drum. Pump suction was taken from the drum through a short section of 3-inch flexible hose. A slurry containing between about ½ and about 1 pound of urea per gallon of oil was circulated through the system for about 8 minutes. The rate of circulation was such that the slurry passed about 15 times through the system. This is a much more severe treatment than normally occurs in the field. The extraordinarily severe test was employed to detect any differences between prills from several manufacturers, all the prills apparently being satisfactory for field use. Results of two of these tests are presented in Table I.

Table I

| Sample | Crushing Strength, Pounds | Percent Breakage in Pumping Test |
|---|---|---|
| 1 | 0.75 | 21.7 |
| 2 | 0.95 | 6.5 |

The present breakage was determined by sieve analysis before and after the pumping test. The weaker material broke up rather badly in the pumping test. Since the time that these pumping tests were made, it has been found that a somewhat weaker material was satisfactory in a field test. Therefore, it will be apparent that the pumping test was too severe and that a somewhat weaker material than Sample 1 can be successfully used. The principal significance of the table is to show the correlation between the simple laboratory crushing test and breakage during handling of prilled urea through pumps, couplings, and tubing.

As in most fracturing operations where spacer particles are used with permanent props, the spacer particles should be of substantially the same size as the props. The average diameter of spacers should be at least about 0.5 times the average diameter of the props. This is to avoid the danger of the spacers sealing the openings between the props. Ordinarily, the spacers should be no larger than the props. This is because it is usually advisable to place props as large as possible in the fracture. If the props are as large as can be placed in the fracture, the spacers cannot, of course, be larger. Under some circumstances, however, as where a slight dissolving of the spacers during the fracturing operation is probable, it may be desirable to use spacers having an average diameter up to about 1.5 times the average diameter of the props. The volume of spacers should be between about 50 percent and about 95 percent of the total volume of spacers and props. The minimum limit is to provide an appreciable spacing action. The maximum limit is to avoid excessive crushing or flattening of the props. Use of amounts of spacers outside these limits is, of course, possible under special circumstances, but generally should be avoided.

The nature of the permanent props to be used with the prilled urea in shallow wells may not be too critical. In most practical operations, however, it is important that a malleable propping material such as aluminum, ground nut shells, plastics, or the like is used. These propping materials simply deform when a load is placed on them rather than shattering into many small pieces. The use of spacers with strong brittle props such as some glass beads may also be advisable even in deep wells.

Urea is very water-soluble. Therefore, the urea should not be used in an aqueous fracturing liquid unless a coating of an oil-soluble material such as a coumarone-indene resin, naphthalene, paraffin or the like is applied. Ordinarily, the urea should be used as a spacer material in oil-base fracturing liquids.

There is some tendency for the urea prills to stick together, particularly at high temperatures, and conditions of high humidity. Therefore, it is generally desirable to dust the prills with a finely divided powder such as bentonite, talc or the like.

Props and urea prills may be separately blended simultaneously into the fracturing fluid by standard techniques well known in the art. It is also possible to premix the props and prills before they are added to a fracturing liquid. In order to avoid separation of props and prills during storage, transportation, or use it may be desirable to make weighted urea prills by blending heavy powders, such as barite, with the molten urea before the urea is introduced into the prilling tower. Some such powders have the advantage of increasing the strength of the prills.

Since most inexpensive heavy powders such as barite are water-insoluble, however, they have the disadvantage of being left in the fracture after the urea is dissolved. Ordinarily, this fine powder is not sufficiently harmful to be objectionable.

In general, standard fracturing techniques can be used. The concentration and size of props and spacers can be tapered, the props and spacers can be used in the entire fracture, or the mixture can be preceded by 100 percent props during the early part of the operation. The ratio of props to spacers can be varied during the fracturing job. Many other variations will be apparent to those skilled in the art. Therefore, I wish to be limited only by the scope of the following claims.

I claim:

1. In a process for fracturing a formation penetrated by a well, in which process a fracturing liquid is injected into the formation under a pressure sufficient to fracture the formation and deposit in the fracture a mixture of permanent props and spacer particles soluble in well fluids, the improvement comprising employing as said spacer particles prilled urea of substantially the same particle size as said permanent props.

2. The process of claim 1 in which the particles of prilled urea have an average crushing strength of at least about $10D$ pounds where $D$ is the average diameter of the prilled urea particles in inches.

3. The process of claim 1 in which the volume of prilled urea is equal to from about 50 to 95 percent of the total volume of prilled urea and permanent props.

4. The process of claim 3 in which the particles of prilled urea have an average crushing strength of at least about $10D$ pounds where $D$ is the average diameter of the prilled urea particles in inches.

5. The process of claim 1 in which the prilled urea particles have an average diameter between about 0.5 and about 1.5 times the average diameter of the permanent props.

6. The process of claim 1 in which the prilled urea particles are coated with an oil-soluble material and the fracturing liquid is aqueous.

7. The process of claim 1 in which a mineral oil is used as the fracturing liquid whereby the prilled urea particles need not be coated.

8. In a process for fracturing a formation penetrated by a well, in which process a fracturing liquid is injected into the formation under a pressure sufficient to fracture the formation and deposit in the fracture a mixture of permanent props and spacer particles soluble in well fluids, the improvement comprising employing as said spacer particles prilled urea of substantially the same particle size as said permanent props, the ratio of prilled urea particles to permanent props being sufficient to result in the formation of a partial mono-layer of props in said fracture after the urea has been dissolved.

References Cited by the Examiner

"Resin Spaces Out Prop Agents in Well," The Oil and Gas Journal, September 30, 1963, page 33.

CHARLES E. O'CONNELL, *Primary Examiner.*